United States Patent [19]

Takino et al.

[11] Patent Number: 4,896,235

[45] Date of Patent: Jan. 23, 1990

[54] MAGNETIC TRANSDUCER HEAD UTILIZING MAGNETORESISTANCE EFFECT

[75] Inventors: Hiroshi Takino, Kanagawa, Japan; Shigeyoshi Imakoshi, deceased, late of Kanagawa, Japan, by Yuko Imakoshi, heir; Nobuhiro Terada, Miyagi, Japan; Norio Saito, Miyagi, Japan; Hideo Suyama, Miyagi, Japan; Kenichiro Tsunewaki, Miyagi, Japan

[73] Assignee: Sony Corporation, Tokyo, Japan

[21] Appl. No.: 298,299

[22] Filed: Jan. 17, 1989

Related U.S. Application Data

[63] Continuation of Ser. No. 927,133, Nov. 5, 1986, abandoned.

[30] Foreign Application Priority Data

Nov. 5, 1985 [JP] Japan .................................. 60-247752

[51] Int. Cl.⁴ .................................................. G11B 5/30
[52] U.S. Cl. ....................................... 360/113; 324/252; 338/32 R
[58] Field of Search ......................... 360/113; 324/252; 338/32 R

[56] References Cited

U.S. PATENT DOCUMENTS

| | | | |
|---|---|---|---|
| 3,860,965 | 1/1975 | Voegeli | 360/113 |
| 3,864,751 | 2/1975 | Beaulieu et al. | 360/113 |
| 4,034,414 | 7/1977 | Kaminaka et al. | 360/113 |
| 4,356,523 | 10/1982 | Yeh | 360/113 |
| 4,626,946 | 12/1986 | Vinal | 360/113 |
| 4,668,913 | 5/1987 | Vinal | 360/113 X |
| 4,673,998 | 6/1987 | Souda et al. | 360/113 |

FOREIGN PATENT DOCUMENTS

54-48575   4/1979   Japan .................................. 360/113

Primary Examiner—John H. Wolff
Attorney, Agent, or Firm—Hill, Van Santen, Steadman & Simpson

[57] ABSTRACT

A MR magnetic head with a sensing element which comprises a plurality of superposed magnetic layers which have a magnetoresistance effect in at least one and a nonmagnetic intermediate layer sandwiched between the magnetic layers, and a sensing current is fed so as to flow in the sensing element in the same direction as a signal magnetic field which is applied to the element. Each of the magnetic layers is formed so as to have an easy axis of magnetization which is substantially perpendicular to the signal magnetic field or to have an isotropic magnetic characteristic in the magnetic film plane, which eliminates Barkhausen noise.

13 Claims, 8 Drawing Sheets

MAGNETIC TRANSDUCER HEAD UTILIZING MAGNETORESISTANCE EFFECT

This is a continuation of application Ser. No. 927,133, filed Nov. 5, 1986, now abandoned.

BACKGROUND OF THE INVENTION

The present invention relates to a magnetoresistance effect type magnetic transducer head (hereinafter referred to as a MR magnetic head).

In the conventional MR magnetic head known heretofore, generally the sensing element comprises a single MR magnetic layer, and a sensing current is fed to flow in the plane direction of the MR magnetic layer and also in the direction transverse the track of its surface so that it opposes to a magnetic recording medium so that a resistance variation, which is derived from a signal magnetic field which is applied to the MR magnetic layer, is detected in the form of, for example, a voltage variation. In other words, the sensing current flows in the MR magnetic layer perpendicular to the signal magnetic field which is applied from the magnetic recording medium. In the case of using a single MR magnetic layer, the magnetic thin film has a domain structure so as to maintain a state where the sum of the magnetic anisotropy energy, the magnetostatic energy resulting from shape anisotropy and so forth is minimized for the entire magnetic layer. The magnetic energy is stable when the magnetic film is divided into a plurality of magnetic domains, as explained hereinafter in the present specification. When the external magnetic field is applied to the magnetic film, magnetization of the magnetic film causes domain wall displacement. The domain wall displacement causes the Barkhausen noise which is not desirable for reproducing operation of the magnetoresistance effect type magnetic transducer head.

OBJECT AND SUMMARY OF THE INVENTION

Accordingly, it is an object of the present invention to provide an improved magnetic transducer head utilizing the magnetoresistance effect.

It is another object of the present invention to provide a magnetic transducer head utilizing the magnetoresistance effect which effectively avoids the generation of Barkhausen noise.

It is further object of the present invention to provide a magnetic transducer head utilizing the magnetoresistance effect and has an improved signal to noise ratio.

According to one aspect of the present invention there is provided a magnetic transducer head utilizing the magnetoresistance effect which comprises a sensing element composed of first and second soft magnetic layers superposed on each other and has a non magnetic layer between the first and second soft magnetic layers, with at least one of the soft magnetic layers having a magnetoresistance effect and the first and second soft magnetic layers being magnetostatically coupled through the non magnetic layer, a pair of electrodes being connected to said sensing element at first and second end portions of the sensing element so as to cause the flow of a sense current through the sensing element in one direction between the first and second end portions, the sensing element receiving a signal magnetic field which is parallel to said one direction, and the soft magnetic layers having an easy axis of magnetization substantially perpendicular to said one direction or having an isotropic magnetic characteristic in a major surface of the soft magnetic layer.

DESCRIPTION OF THE PREFERRED EMBODIMENTS

Figure 1:
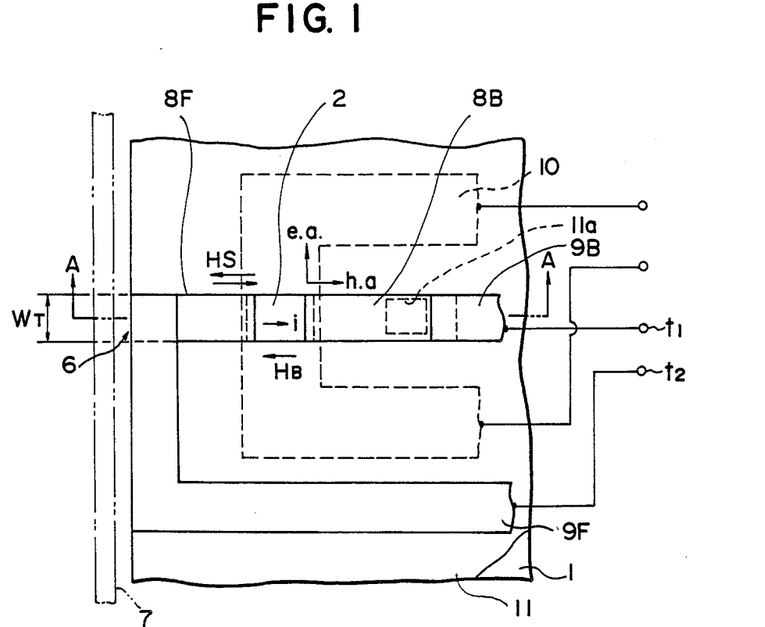
FIG. 1 is a schematic enlarged plan view of an exemplary MR type magnetic head according to the present invention.
Figure 2:
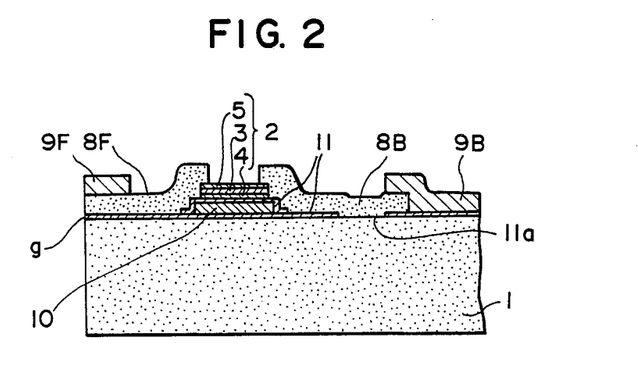
FIG. 2 is a cross-sectional view taken along the A—A line in FIG. 1.

As shown in the plan view of FIG. 1 and a sectional view of FIG. 2, an MR magnetic head of the present invention is mounted, on a substrate 1, and has a thin-film sensing element 2 which has a magnetoresistance effect.

A surface is in contact with or is opposed to a magnetic recording medium 7, which is transported in a direction perpendicular to the drawing paper face in FIG. 1.

In the present invention, the sensing element 2 is of a laminated structure where magnetic layers 4 and 5 of a soft magnetic material are superposed with a nonmagnetic intermediate layer 3 between them, and at least one of such magnetic layers exhibits the magnetoresistance effect. The thickness of the nonmagnetic intermediate layer 3 is selected to be greater than 5 Å and less than 10,000 Å, e.g. within a range of 5 to 500 Å so as to cause magnetostatic interaction between the two magnetic layers 4 and 5 which is more dominant than an exchange interaction. The saturation flux density, thickness and other properties of the magnetic layers 4 and 5 are properly selected so as to obtain mutual equalization of the magnetic flux so that the magnetic flux as a whole is closed with respect to the two magnetic layers 4 and 5.

In case the two magnetic layers 4 and 5 of the sensing element 2 are both formed of a material having magnetoresistance effect, it is to be desired that the two layers 4 and 5 be composed of the same material and be equal to each other in shape and size. However, when merely one of them is composed of a material which has little or no MR effect, the material and thickness of this magnetic layer can be selected so that a sufficiently great resistance is obtained as compared with the other magnetic layer which has a MR effect. In this case, it is necessary to satisfy the condition that the magnetic flux quantities of both magnetic layers are equal to each other.

In the present invention, a signal magnetic field Hs is applied from a magnetic recording medium to the sensing element 2 and a sensing current i is fed so as to flow in the sensing element 2 and is arranged to act in the same direction, and each of the magnetic layers constituting the sensing element 2 is formed so as to have an easy axis of magnetization which is perpendicular to the signal magnetic field or to be isotropic without having anisotropy in the principal plane of the magnetic layer.

In a state when no signal magnetic field is applied to the sensing element 2, a required bias magnetic field is applied from an external source in a manner such that magnetization is effected at a predetermined angle of, e.g. 45°, to the direction of the sensing current i.

According to the above-mentioned structure of the present invention, Barkhausen noise can be effectively eliminated as will be described below.

Figure 14:
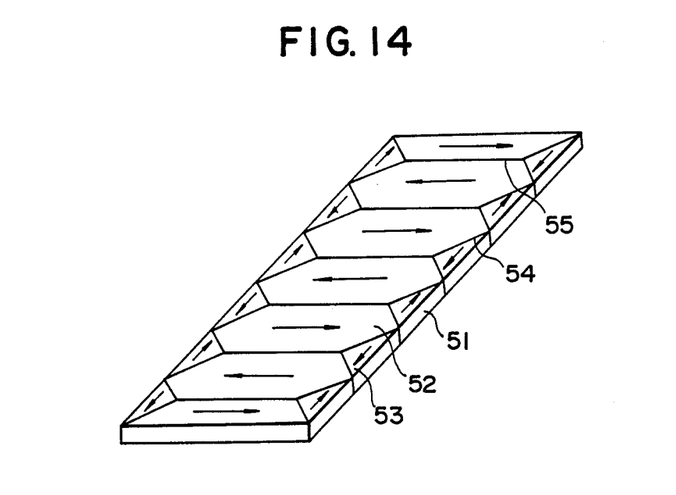
FIG. 14 is a schematic illustration of the magnetic domain structure formed in a prior art single layer MR magnetic thin film.

The generation of Barkhausen noise in the conventional MR magnetic head which has a sensing element which comprises a single MR magnetic layer, such layer has a magnetic domain structure as shown in FIG. 14 so as to maintain a state where the sum of the magnetic anisotropy energy, the magnetostatic energy resulting from shape anisotropy is minimized with respect to the entire layer. In the case of a single magnetic layer which is a rectangular thin-film magnetic layer 51 which has magnetic anisotropy in its short-side or transverse direction, the magnetic domains 52 alternately reverse relative to the direction of the transverse magnetization which are produced in the film plane, and sequentially reverse magnetic domains 53 are produced between the ends of the adjacent magnetic domains 52 in the long-side or longitudinal direction of the magnetic layer in such a manner that a closed loop is formed with regard to the adjacent magnetic domains 52. Therefore, if an external magnetic field is applied to such magnetic layer, domain walls 54 and 55 are displaced to consequently generate Barkhausen noise.

Figure 3:
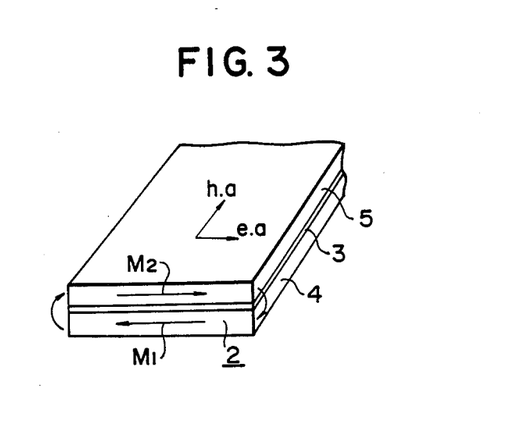
FIG. 3 shows the magnetization state of a sensing element employed in the present invention.
Figure 4:
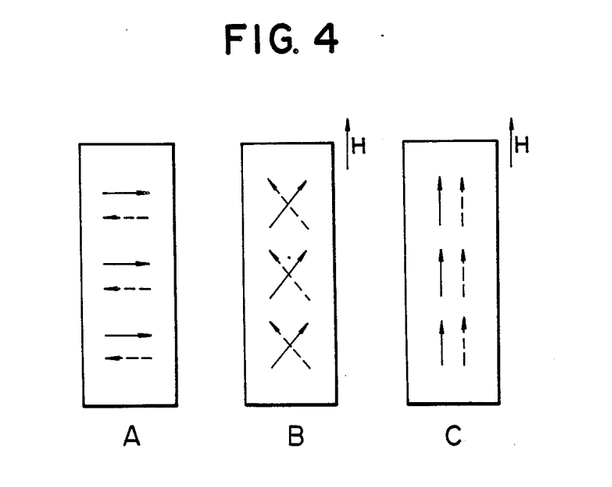
FIGS. 4A through 4C show the magnetization state of the sensing element upon application of an external magnetic field thereto.

In the construction of the present invention which, differs from the above, magnetic layers 4 and 5 are superposed with a nonmagnetic intermediate layer 3 therebetween so that, when no external magnetic field is applied, the magnetic layers 4 and 5 are magnetized in mutually reverse parallel directions along the respective easy axes of magnetization as indicated by arrows M1 and M2 in FIG. 3, and no magnetic domain wall exists. The nonexistence of any domain wall has been confirmed through observation of magnetic domains by the Bitter process using a magnetic fluid. When an external magnetic field H is gradually increased in intensity along the hard axis of magnetization of such sensing element 3, as typically shown in FIG. 4 A through C where solid-line arrows represent the magnetized state of the magnetic layer 5 and broken-line arrows represent that of the magnetic layer 4, the magnetization is rotated by the external magnetic field H from the mutually reverse parallel state of FIG. 4 A described in connection with FIG. 3 to the state of FIG. 4 B. When a higher-intensity external magnetic field is applied, the magnetic layers 4 and 5 are magnetized in the same direction as shown in FIG. 4 C. In this case, the magnetization is rotated in the planes of the magnetic layers 4 and 5, so that no domain wall is produced which avoids the generation of Barkhausen noise. That is, by causing the flux flow to be coincident with the hard axes of magnetization in both of the magnetic layers 4 and 5, it becomes possible to avoid the Barkhausen noise that results from domain walls displacement.

Figure 5:
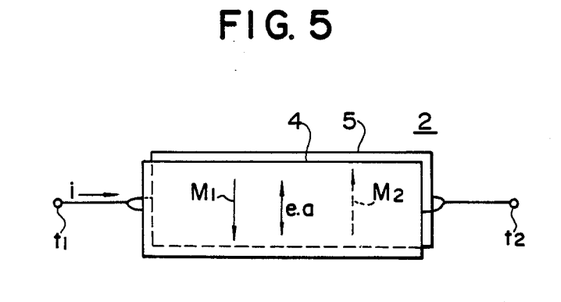
FIGS. 5 through 7 show the operation of the magnetic transducer head according to the present invention.
Figure 6:
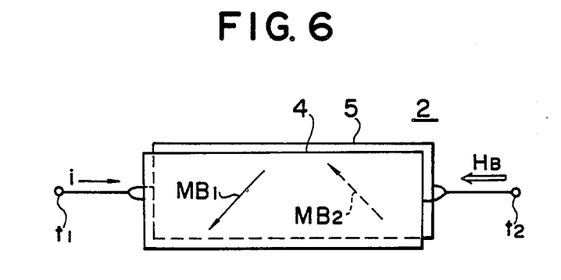
Figure 7:
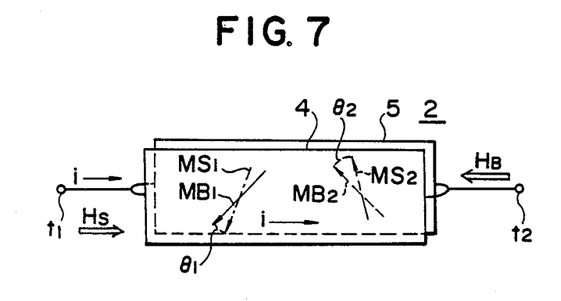

Now the operation of the magnetic head according to the present invention will be described below with reference to FIGS. 5 through 7, which typically show merely the two magnetic layers 4 and 5 of the sensing element 2. In the initial state, the magnetic layers 4 and 5 have easy axes of magnetization in the directions indicated by e.a in FIG. 5, and a sensing current i is fed so as to flow in the magnetic layers 4 and 5. Such energization generates mutually reverse magnetic fields perpendicular to the current flow in the magnetic layers 4 and 5 mutually spaced with a nonmagnetic intermediate layer (not shown), therebetween whereby the magnetic layers 4 and 5 are magnetized as indicated by a solid-line arrow M1 and a broken-line arrow M2. When an external bias magnetic field $H_B$ is applied to the sensing element 2 in the direction of the current i, then the directions of magnetization of the magnetic layers 4 and 5 are rotated a required angle as indicated by arrows MB1 and MB2 in FIG. 6. The intensity of the bias magnetic field $H_B$ is so selected that the direction of magnetization determined by such magnetic field $H_B$ has an angle of approximately 45° to the flow of the current i. The procedure for obtaining high sensitivity and linearity by applying the bias magnetic field $H_B$ to induce magnetization of approximately 45° to the sensing current i is similar to that executed with respect to an ordinary MR magnetic head. In the above state, when a signal magnetic field Hs is applied in the direction of the sensing current i or along the hard axis of magnetization as shown in FIG. 7, the direction of magnetization is rotated clockwise and counterclockwise respectively through angles of $\theta 1$ and $-\theta 1$ as indicated by arrows Ms1 and Ms2. Consequently, if both magnetic layers 4 and 5 are made of a material which has a MR effect, resistance variations occur therein. Since the resistance variation in each MR magnetic layer is proportional to $\cos^2 \theta$ (where $\theta$ is an angle variation), when the magnetization directions MB1 and MB2 in the layers 4 and 5 have a difference of 90° as shown in FIG. 6, the increases or decreases caused in the resistance variations relative to the two magnetic layers 4 and 5 by angle variations $\theta 1$ and $-\theta 1$ are coincident with each other. That is, if the resistance of one magnetic layer 4 increases, the resistance of the other magnetic layer 5 also increases in a resistance variation is induced between terminals t1 and t2 of the sensing element 2 due to the resistance variations in the magnetic layers 4 and 5, and such resistance variation can be detected in the form of a voltage variation between the terminals t1 and t2.

Figure 15:
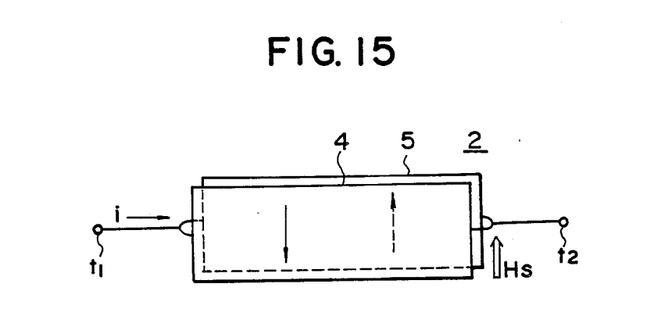
FIG. 15 shows magnetization state of the sensing element for comparison MR head, FIGS. 16 and 17 shown plan views of the sensing element used for explaining the present invention.

Thus, in the present invention, the direction of a sensing current i relative to a magnetic film having a prescribed magnetic anisotropy is selectively set to coincide with the direction in which a signal magnetic field Hs is applied. With such construction where the sensing element 2 comprises the magnetic layers 4, 5 and a nonmagnetic intermediate layer 3 sandwiched therebetween as in the above-described invention, the advantageous features will become more obvious by comparison with an example where the direction of the sensing current i is set to be perpendicular to the direction of the signal magnetic field Hs. That is as shown in FIG. 15 where a large current i is applied to the two magnetic layers 4 and 5 with the anisotropic magnetic field Hk thereof taken into consideration as described previously in connection with FIG. 5, a magnetic field is generated and results in magnetizing the magnetic layers 4 and 5 perpendicularly to the current i as indicated by a solid line and a broken line respectively. When a signal magnetic field Hs is applied in this structure perpendicularly to the current i, it coincides with the direction of magnetization caused by the current i in the magnetic layers 4 and 5, and the magnetic field Hs behaves in the same manner as in the case of application along the easy axis of magnetization. Consequently, there are generated magnetic domain walls and displacement thereof which, eventually induce Barkhausen noise. In a construction where a sensing current i is fed so as to flow along the easy axis of magnetization in the magnetic layer and a signal magnetic field Hs is applied in the same direction as the sensing current, the magnetic layer fails to be magnetized perpendicularly to the sensing current i if this current is relatively small, so that the signal magnetic field Hs is applied substantially along the easy axis of magnetization as in FIG. 15, whereby the undesired result is the generation of Barkhausen noise. Although in the example of FIGS. 5 through 7 a description has been given with respect to a magnetic layer which has an easy axis of magnetization perpendicular to the signal magnetic field Hs, a similar effect is attainable also by the use of an isotropic magnetic layer which has no magnetic anisotropy in its principal plane. In this case, the flow of a relatively small sensing current renders the direction of magnetization perpendicular to the sensing current and hence to the signal magnetic field and avoids the generation of Barkhausen noise.

In the constitution of the present invention, as described above, the magnetic layers 4 and 5 of the MR sensing element 2 are magnetostatically coupled to each other due to the presence of a nonmagnetic intermediate layer 2 which is sandwiched therebetween, so that exchange interaction can be neglected while a sufficiently firm magnetostatic coupling is ensured by the interaction based on Coulomb's law, and Barkhausen noise can be eliminated as the signal magnetic field Hs and the sensing current i are directionally coincident with each other The present invention is applicable to a variety of MR type magnetic heads of different structures including a nonshielded head, a shielded head, and a yoke type head where a signal magnetic flux picked up from a surface in contact with or opposed to a magnetic recording medium is introduced by means of a magnetic yoke and an MR sensing element is disposed in a cut portion formed in the magnetic yoke.

Hereinafter a preferred embodiment of the present invention will be described in detail with reference to FIGS. 1 and 2. This embodiment represents an exemplary constitution of a yoke type MR head.

In this example, a substrate 1 is composed of a magnetic material such as Ni-Zn ferrite, Mn-Zn ferrite or the like. In case the substrate 1 is conductive, first an insulating layer 11 of $SiO_2$ or the like is formed thereon, subsequently a bias conductor 10 is formed on the layer 11 to generate a bias magnetic field when energized, and another insulating layer 11 is formed on the bias conductor 10 so as to form a MR sensing element 2. This element 2 extends perpendicularly to a surface 6 which is to be in contact with or is opposed to a magnetic recording medium, and the bias conductor 10 is so disposed as to traverse under the MR sensing element 2.

A front magnetic yoke 8F and a back magnetic yoke 8B are disposed anterior and posterior to the MR sensing element 2, i.e. at the two ends proximate to the surface 6 and on the reverse side, respectively. The two magnetic layers 8F and 8B are composed of a metallic material which is electrically conductive substantially without MR effect and has magnetic anisotropy which is perpendicular to a sensing current. Terminal conductive layers 9F and 9B are electrically connected to the magnetic layers 8F and 8B respectively, and terminals t1 and t2 are led out therefrom. In order to prevent generation of Barkhausen noise which is caused by the magnetic layers 8F and 8B, such layers may be superposed with a nonmagnetic intermediate layer sandwiched therebetween. A portion of the back magnetic layer 8B is magnetically connected to the magnetic substrate 1 through a window 11a formed in a nonmagnetic layer 11, so that a closed magnetic path is formed by way of substrate 1—front magnetic layer 8F—MR sensing element 2—back magnetic layer 8B—substrate 1. Between the fore end of the front magnetic layer 8F and the substrate 1, there is formed a magnetic gap g confronting the surface 6 which is to be in contact with or opposed to the magnetic recording medium, and the length of such gap g is prescribed by the thickness of a nonmagnetic layer such as the insulating layer 11.

The MR sensing element 2 can be continuously produced in a single integrated step by the techniques of sputtering or vacuum evaporation. That is, the aforesaid magnetic layer 4, the nonmagnetic intermediate layer 3 and the magnetic layer 5 are formed in sequence by the use of a sputtering apparatus or a vacuum evaporation apparatus equipped respectively, with sputter sources or evaporation sources of individual materials. In the example illustrated, each of the magnetic layers 4 and 5 has an easy axis of magnetization in the direction indicated by e.a and a hard axis of magnetization in the direction indicated by h.a. As mentioned previously, each of the magnetic layers 4 and 5 may be composed of an isotropic magnetic film having no anisotropy in its principal plane.

The nonmagnetic intermediate layer 3 is composed of an insulating or conductive nonmagnetic material such as $SiO_2$, Ti or the like, and its thickness is selectively set to an adequate value of, e.g. 20 Å so that exchange interaction is substantially not exerted between the two magnetic layers 4 and 5 and also such that magnetostatic coupling is effected therebetween due to the interaction according to Coulomb's law.

Although the nonmagnetic intermediate layer 3 is formed so as to have an adequate thickness for inducing magnetostatic coupling between the two magnetic layers 4 and 5, practically the thickness required for ensuring electrical insulation is about ten times greater than the thickness selected for shutting off magnetic exchange interaction. Therefore, when reducing the thickness of the intermediate layer 3, electrical connection is substantially effected between the two magnetic layers 4 and 5. However, in case such electrical connection is not effected, it is necessary to electrically connect the terminal conductive layers 9F and 9B respectively to the magnetic layers 4 and 5. That is, in the above example, the magnetic layers 8F and 8B need to be electrically connected respectively to the magnetic layers 4 and 5 which constitute the sensing element.

It is possible to electrically insulate the magnetic layers 4 and 5 by the nonmagnetic intermediate layer 3 with a sufficient thickness, and cause a sense current in only one of the magnetic layers. In this case, both of the magnetic layers are, of course, magnetostatically coupled with each other, though, the resistance change of only one magnetic layer is detected upon application of the signal magnetic layer. By this construction it is possible to increase the sensitivity of the sensing element.

The layers 4 and 5 of the MR sensing element 2 may be formed of MR magnetic layers of the same composition and of the same size and shape with uniaxial anisotropy or without anisotropy in the principal planes thereof. Such MR magnetic layers may be composed of a single metal such as Fe, Ni or Co, or an alloy of two or more thereof.

In the construction mentioned above, the individual layers inclusive of insulating layer 11, bias conductor 10, magnetic layers 4 and 5 of the sensing element 2, nonmagnetic intermediate layer 3, magnetic yokes 8F and 8B, and terminal conductive layers 9F and 9B and so forth can be formed by sputtering or by evaporation, and each can be shaped into a desired pattern by photolithography technique.

In this construction, the sensing element 2 is supplied with a dc sensing current i between its terminal conductive layers 9F and 9B, hence between the magnetic layers 8F and 8B, and a prescribed current will flow in the bias conductor 10 so as to apply a required bias magnetic field. In such a state, a magnetic recording medium 7 is transported perpendicularly to the drawing paper face of FIG. 1 while being kept in contact with or opposite to the surface 6, whereby a signal magnetic flux corresponding to the recorded magnetization on the medium 7 is picked up from the magnetic gap g and is then fed to the closed magnetic path formed by way of the aforesaid magnetic layer 8F—MR sensing element 2—magnetic layer 8B—substrate 1. Accordingly a signal magnetic field Hs derived from the magnetic recording medium 7 is applied to the MR sensing element 2 in the same direction as the sensing current i. It follows, therefore, that the recorded signal is read out from the magnetic recording medium 7 while generation of Barkhausen noise is avoided as described above.

In addition to the foregoing example where both magnetic layers 4 and 5 of the MR sensing element are formed of MR layers, it is possible to produce a modification where merely one of the layers 4 and 5 is formed of a magnetic layer having almost no MR effect (hereinafter referred to as a non-MR magnetic layer). In this case also the thickness and other conditions are so selected that the amount of flux of the two magnetic layers 4 and 5 become equal to each other as mentioned previously. Meanwhile, the magnetic layer having almost no MR effect may be composed of a high-resistivity, high-permeability magnetic material such as amorphous alloy of FeCoSiB, CoZrNb or Sendust alloy of Fe-Al-Si which have high resistivity so that the resistance between the conductive magnetic layers 8F and 8B at the two ends becomes sufficiently high to allow the sensing current to flow principally in the magnetic layer having MR effect. Another recommendable material for the high-permeability magnetic layer having little MR effect is, for example, Mo permalloy. Such material is of course usable for the conductive magnetic layers 8F and 8B as well.

Figure 18:
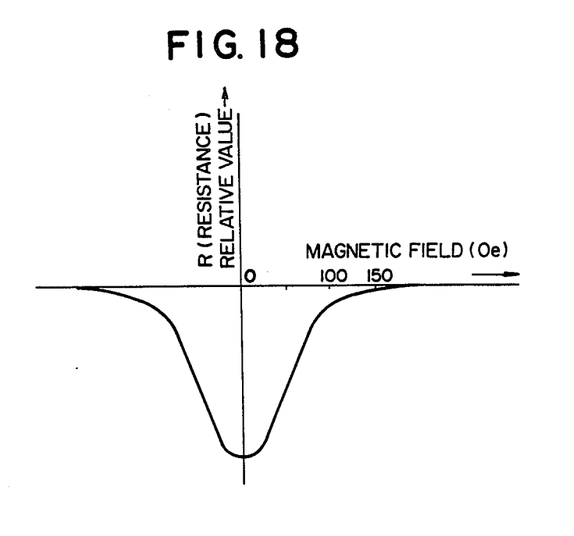
FIG. 18 is a graph showing the MR characteristics curve to explain the present invention.

In addition to the above example where the bias conductor 10 is disposed under the sensing element 2 and an external magnetic field $H_B$ is applied to the sensing element 2, the position and pattern of the bias conductor 10 may be modified in various manners, and it may be formed into a multilayer or a spiral structure. Furthermore, the magnetic field to be applied is not limited to one induced electrically, and a permanent-magnet thin film is usable as well. FIG. 18 graphically shows the MR characteristic of the MR sensing element according to the present invention. The curve represents the characteristic obtained when a sensing cureent of 10 mA is fed so as to flow in the sensing element of 4 $\mu m \times 4$ $\mu m$ where magnetic layers of Ni-Fe alloy having a thickness of 300 Å are superposed with an intermediate layer of $SiO_2$ having a thickness of 40 Å, and a magnetic field is applied in the same direction as the sensing current. In this case, each of the magnetic layers is composed of an isotropic film having no magnetic anisotropy in its plane. As is apparent from the graph, there is no generation of Barkhausen noise.

Besides the above example of a yoke type structure where a closed magnetic path including the sensing element 2 is formed by the magnetic substrate 1 and the magnetic layers 4 and 5, the invention may be modified to another structure where the sensing element 2 substantially confronts the magnetic recording medium, or to a single pole structure where a closed magnetic path is not formed by the magnetic head itself.

Figure 8:
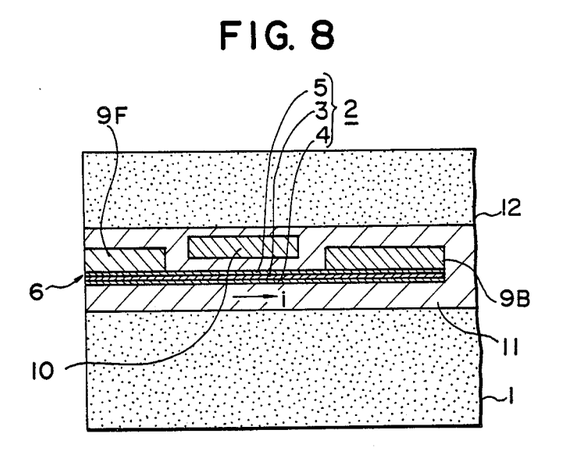
FIG. 8 is a sectional view of another magnetic transducer head according to the present invention.

FIG. 8 shows an example where the present invention is applied to a shielded MR type magnetic head, in which a sensing element 2 is spaced apart by a predetermined distance as an insulating layer 11 interposed between two magnetic substrates 1 and 12. However, the substrate 12 may be composed of a thin film as well. In FIG. 8, terminal conductive layers 9F and 9B which are electrically connected to two magnetic layers 4 and 5 superposed with a nonmagnetic intermediate layer 3 therebetween. The discontinuous portion between the conductive layers 9F and 9B functions as the sensing element 2, and a sensing current i is fed to flow therein as shown. The terminal conductive layer 9F may also serve as a path for introducing a magnetic flux to the sensing element 2, and it may be composed of a conductive magnetic material having a thickness of 2000 Å or so.

Relative to this example, a type which has none of the magnetic substrates 1 and 12 is termed a nonshielded MR head.

Figure 16:
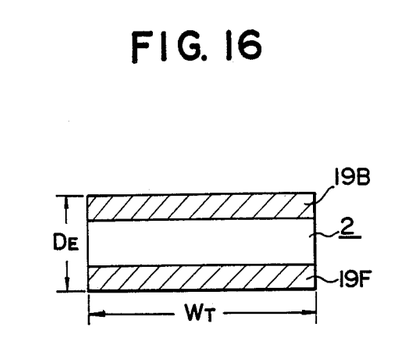
Figure 17:
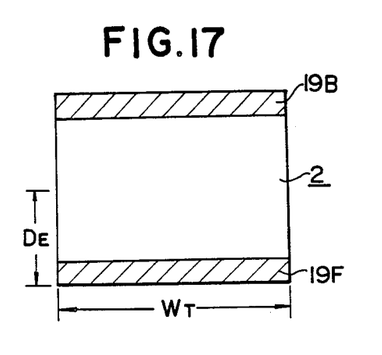

In the magnetic head of the present invention, a sensing current is fed to flow in the MR sensing element 2 perpendicularly to the track width $W_T$ as shown in FIG. 1, and the leakage magnetic field Hs from the magnetic recording medium 7 is obtained by detecting the resistance variations between the fore end and the hind end of the sensing element 2, whereby the recorded signal is reproduced. In this stage, if the track width $W_T$ corresponding to the width of the MR sensing element 2 is large, there arises a problem with respect to the signal-to-noise ratio. That is, the signal magnetic field Hs from the recording medium 7 suddenly attenuates with increase of the distance from the medium 7. Such attenuation changes depending on the wavelength and tends to be greater as the wavelength becomes shorter It is desired that the MR sensing element 2 be disposed within the effective reach of the magnetic field from the recording medium 7. If disposed outside of such reach, the sensing element 2 fails to function properly and brings about reduction of the signal-to-noise ratio. Suppose now that the depth DE equivalent to the reach of the magnetic field from the recording medium is smaller than the track width $W_T$ and, as shown in FIG. 16, the length in the direction of the sensing current flow through substantial current-conducting terminals 19F and 19B at the two ends of the sensing element 2 is set to be equal to the depth $D_E$. Then, there arises a disadvantage in that the resistance value which is to be detected as a resistance variation in the MR sensing element 2 fails to be sufficiently large for easy signal processing. To the contrary, if the above length of the MR sensing element 2 is set to be greater than the extent of the magnetic field from the recording medium as shown in FIG. 17, the ineffective portion is rendered large to eventually bring about reduction of the signal-to-noise ratio. Thus, the problem of the resistance value and that of the signal-to-noise ratio are incompatible with each other. Meanwhile, the Barkhausen noise suppression effect becomes higher as the current density increases. It is therefore desired that the direction of the sensing current flow be coincident with the longitudinal direction of the MR sensing element.

Figure 9:
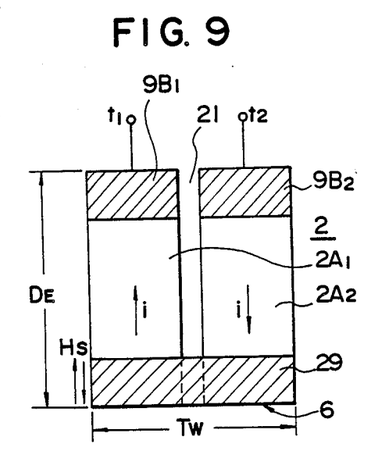
FIGS. 9 through 11 show plan views of other embodiments of the sensing elements according to the present invention.
Figure 10:
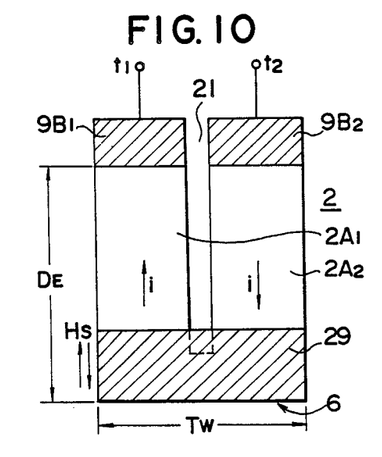

For solving the problems of the aforesaid resistance value, the signal-to-noise ratio and the current density in such a case where the track width $W_T$ is greater than the depth $D_E$ of extent of the magnetic field from the recording medium, the MR sensing element 2 is divided into a plurality of regions at least on its rear side with respect to the direction of the track width and at least in the inner portion thereof within the depth $D_E$ of extent of the magnetic field from the recording medium. For example, as shown in FIG. 9, the whole MR sensing element 2 is so shaped as to have a predetermined track width $T_W$, and a slit 21 is formed at its center perpendicularly to the surface 6 which is to be in contact with or opposed to the magnetic recording medium, in such a manner as to extend over the entire area from the hind end to the fore end, or the fore end is partially left unsplit as shown in FIG. 10, whereby the MR sensing element 2 is divided into at least two MR sensing regions 2A1 and 2A2. A coupling layer 29 which is at least conductive and having a high permeability and a soft magnetic property without MR effect is deposited to extend over the fore ends of such two sensing regions, and terminals t1 and t2 are led out respectively, from terminal conductive layers 9B1 and 9B2 which are deposited at the hind ends of such MR sensing regions 2A1 and 2A2. Although the entire width of the MR sensing element 2 is sufficiently great for forming the required track width $T_W$ in the above structure, the path of a sensing current i fed between the terminals t1 and t2 can be defined in the longitudinal direction of the narrowed regions 2A1 and 2A2 along a signal magnetic field Hs from the magnetic recording medium. Although the coupling layer 29 may be composed of a nonmagnetic conductive material as mentioned previously, a conductive high-permeability magnetic material is usable as well. If the coupling layer is composed of a conductive high-permeability magnetic material, it becomes possible to eliminate any portion that is not sensitive to the magnetic flux between the two MR sensing regions 2A1 and 2A2, thereby preventing reduction of the signal magnetic flux flowing into the MR sensing regions. When the coupling layer 29 is formed by the use of a conductive high-permeability magnetic material, it may be shaped into a multilayer structure with a nonmagnetic intermediate layer so as to avert generation of Barkhausen noise.

In case the MR sensing element 2 is shaped into a structure divided with respect to the direction of the track width, the actual path of the sensing current i can be narrowed if the track width $W_T$ is great, thereby ensuring advantages such that a sufficiently large resistance value can be obtained and the current density is increased even when the depth of the MR sensing element 2 is decreased in accordance with the depth $D_E$ of extent of the signal magnetic field.

The MR sensing element 2 is not limited to the above examples of FIGS. 9 and 10 which are divided into two sensing regions 2A1 and 2A2 with respect to the common track width $W_T$. It may be modified to a structure of FIG. 11 where three or more MR sensing regions 2A1, 2A2, 2A3 ... 2An are formed for one track, and the respective fore ends and hind ends of the adjacent regions 2A1–2A2, 2A2–2A3 and so forth are coupled alternately to each other by means of coupling layers 29 to form a zigzag-pattern path of a sensing current i.

Figure 11:
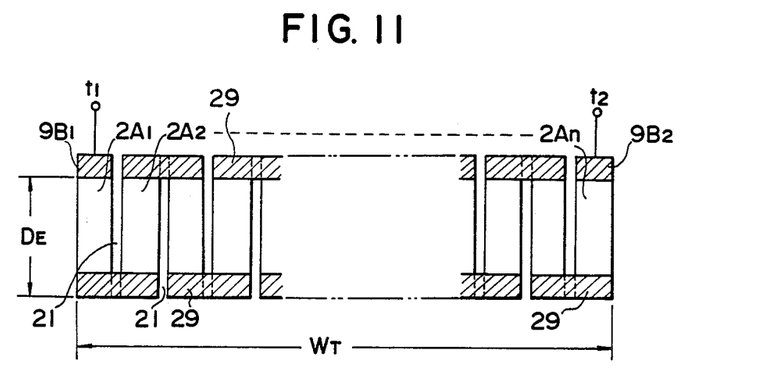
Figure 12:
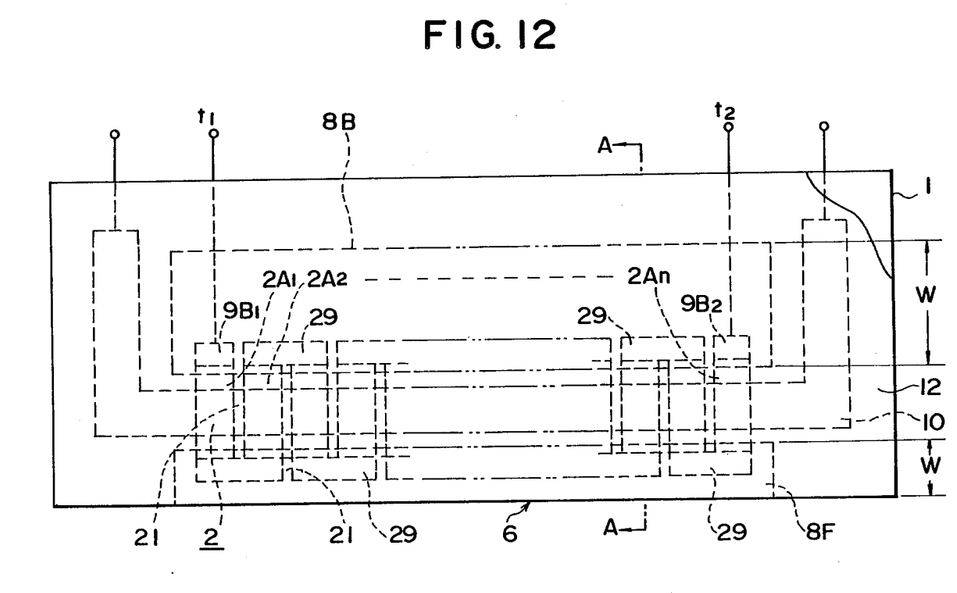
FIG. 12 is an enlarged plan view of a further embodiment of the magnetic transducer head according to the present invention.
Figure 13:
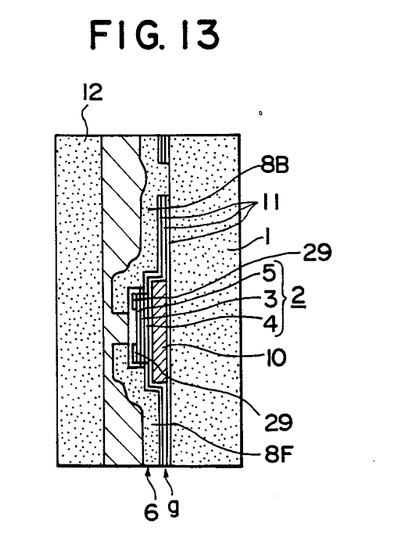
FIG. 13 is a sectional view taken along A—A line in FIG. 12.

Thus, even with a modified magnetic head structure where a common track is shaped by two or more MR sensing regions, 2A1, 2A2 and so forth, it is also possible to form a shielded, a nonshielded or a yoke type head as in the foregoing embodiment having a single sensing element 2. FIG. 12 is a plan view of an exemplary yoke type head, and FIG. 13 is its sectional view taken along the line A—A. In FIGS. 12 and 13, component members corresponding to those employed in FIGS. 1, 2 and 11 are denoted by the same reference numerals, and an explanation is omitted. In this embodiment, a front magnetic layer 8F and a back magnetic layer 8B extend across fore ends and hind ends of MR sensing regions 2A1, 2A2 ... 2An, respectively. In such a construction, the MR sensing element 2 (2A1, 2A2 ... 2An) comprises magnetic layers 4 and 5 of NiFe alloy each having a thickness of 300 Å and a nonmagnetic intermediate layer 3 of SiO$_2$ having a thickness of 50 Å. Furthermore, the front magnetic layer 8F has a thickness of 2000 Å and a width (depth) $W_F$ of 3 μm while the back magnetic layer 8B also has a thickness of 2000 Å and a width (depth) $W_B$ of 12 μm, and such two magnetic layers 8F and 8B are spaced apart from each other by a distance of 8 μm. Moreover, a protective plate 12 is disposed opposite to the substrate 1. The protective plate 12 may be composed of a thin film. Coupling layers 29 are electrically isolated from the front magnetic layer 8F and the back magnetic layer 8B, respectively, through an insulating layer 11. In case the MR sensing element 2 is divided into a plurality of regions as mentioned above and the fore ends thereof are mutually separated to have a discontinuous portion within the common track width $W_T$, and it is rendered possible to achieve the same effect as in the preceding example of a single continuous track by setting the fore-end width of the slit 21 to a small value.

In addition to the illustrated embodiments where the magnetic head has a single track, various modifications may be made such as a multitrack or multichannel magnetic head structure where a plurality of MR sensing elements 2 are arrayed on a common substrate 1 with a plurality of tracks confronting the surface 6 which is to be in contact with or opposed to a common magnetic recording medium.

In the magnetic head of the present invention where its MR sensing element 2 comprises two magnetic layers 4 and 5 superposed with a nonmagnetic intermediate layer 3. The application of a signal magnetic field Hs to the MR sensing element 2 is executed, in the same direction as a sensing current i which is fed to flow therein, and the magnetic layers 4 and 5 are so formed as to have anisotropy in a specific direction or to be isotropic, thereby effectively eliminating generation of Barkhausen noise to realize an improved reproducing magnetic head of a high signal-to-noise ratio. Due to the thin-film magnetic head structure, a high efficiency is achieved in mass production and multitrack MR type magnetic heads can be easily manufactured.

What is claimed is:

1. A magnetic transducer head utilizing magnetoresistance effect comprising;
   first and second sensing elements arranged parallel to each other and each subject to a common signal magnetic field,
   each of said first and second sensing elements being composed of first and second soft magnetic layers which are superimposed and a nonmagnetic layer mounted between said first and second soft magnetic layers and forming a track width (TW),
   at least one of said first and second soft magnetic layers having a magnetoresistance effect and said first and second soft magnetic layers magnetostatically coupled through said nonmagnetic layer,
   a pair of electrodes connected to each of said first and second sensing elements at first and second end portions of each of said first and second sensing elements and said first and second sensing elements connected in series, a sense current flows through said first and second sensing elements in opposite directions,
   said first and second sensing elements receiving a signal magnetic field which is parallel to said sense current, and said first and second soft magnetic layers having an easy axis of magnetization which is substantially perpendicular to said sense current, at least one slit formed in said first and second sensing elements in a direction perpendicular to said track width and a coupling layer 29 extending between said first and second sense elements in a direction parallel to said track width.

2. A magnetic transducer head utilizing magnetoresistance effect comprising;
   a plurality of sensing elements arranged parallel to each other and receiving a common signal magnetic field across a track width (TW),
   each of said plurality of sensing elements each comprising first and second superimposed soft magnetic layers and a nonmagnetic layer between said first and second soft magnetic layers,
   at least one of said soft magnetic layers having a magnetoresistance effect and said first and second soft magnetic layers magnetostatically coupled to each other through said nonmagnetic layer,
   electrodes connected to each of said plurality of sensing elements which are connected in series so that a sense current flows through said sensing elements in opposite directions,
   said plurality of sensing elements receiving said signal magnetic field which is parallel to said sense currents, and said first and second soft magnetic layers having an easy axis of magnetization which is substantially perpendicular to said sense currents, a slit formed in said plurality sensing elements in a direction perpendicular to said track width and a coupling layer (29) extending between said plurality of sensing elements in a direction parallel to said track width.

3. A magnetic transducer head utilizing magnetoresistance effect according to claim 1 or 2, wherein said nonmagnetic layer has a thickness between 5 and 10,000 Å.

4. A magnetic transducer head utilizing magnetoresistance effect according to claim 1 or 2, wherein each of said electrodes is connected to said first and second soft magnetic layers respectively.

5. A magnetic transducer head utilizing magnetoresistance effect according to claim 1 or 2, wherein said first and second soft magnetic layers are electrically connected together through said nonmagnetic layer.

6. A magnetic transducer head utilizing magnetoresistance effect according to claim 1 or 2, wherein said first soft magnetic layer has a relatively large magnetoresistance effect and said second soft magnetic layer has no or a small magnetoresistance effect.

7. A magnetic transducer head utilizing magnetoresistance effect according to claim 1 or 2, wherein said first soft magnetic layer has a relatively large magnetoresistance effect, said second soft magnetic layer has no or a small magnetoresistance effect, said first and second soft magnetic layers are electrically insulated by said nonmagnetic layer, and said pair of electrodes are connected to said first soft magnetic layer.

8. A magnetic transducer head utilizing magnetoresistance effect according to claim 1 or 2, further comprising means for applying a bias magnetic field to each of said sensing elements along said one direction.

9. A magnetic transducer head utilizing magnetoresistance effect according to claim 8, wherein said means for applying a bias magnetic field is a conductor provided adjacent to each of said sensing elements to cause a bias current to flow parallel to said sense currents.

10. A magnetic transducer head utilizing magnetoresistance effect according to claim 1 or 2, wherein said sensing elements are arranged to face at one ends thereof to a travelling magnetic recording medium.

11. A magnetic transducer head utilizing magnetoresistance effect according to claim 1 or 2, further comprising a magnetic substrate, a first magnetic yoke which makes a gap with said magnetic substrate, a second magnetic yoke magnetically connected to said magnetic substrate and each of said sensing element is provided to magnetically connect said first and second yokes.

12. A magnetic transducer head utilizing magnetoresistance effect according to claim 1 wherein each of said sensing elements is arranged to have one end face a adjacent travelling magnetic recording medium.

13. A magnetic transducer head utilizing magnetoresistance effect according to claim 1, further comprising a magnetic substrate, a first magnetic yoke which makes a gap with said magnetic substrate, a second magnetic yoke magnetically connected to said magnetic substrate and each of said sensing elements is provided to magnetically connect said first and second yokes.

* * * * *